(12) United States Patent
Friesen et al.

(10) Patent No.: US 7,209,530 B2
(45) Date of Patent: Apr. 24, 2007

(54) MULTI-SHELF SYSTEM CLOCK SYNCHRONIZATION

(75) Inventors: Larry Friesen, Nepean (CA); Dion Pike, Dunrobin (CA); Geoffrey Chi Ho Liu, Ottawa (CA)

(73) Assignee: Alcatei, Paris (FR)

( * ) Notice: Subject to any disclaimer, the term of this patent is extended or adjusted under 35 U.S.C. 154(b) by 748 days.

(21) Appl. No.: 10/670,304

(22) Filed: Sep. 26, 2003

(65) Prior Publication Data

US 2005/0071704 A1    Mar. 31, 2005

(51) Int. Cl.
*H04L 7/02* (2006.01)
(52) U.S. Cl. ...................................... 375/359
(58) Field of Classification Search ................ 375/359, 375/354, 355, 356, 365, 368
See application file for complete search history.

(56) References Cited

U.S. PATENT DOCUMENTS

| | | | | |
|---|---|---|---|---|
| 5,638,410 | A | 6/1997 | Kuddes | 375/357 |
| 5,910,753 | A | 6/1999 | Bogdan | 331/17 |
| 6,229,573 | B1 * | 5/2001 | Sato et al. | 348/516 |
| 2002/0027966 | A1 * | 3/2002 | Fukuhara | 375/376 |
| 2002/0180498 | A1 | 12/2002 | O'Leary et al. | 327/156 |

FOREIGN PATENT DOCUMENTS

EP    1 045 557 A    10/2000

EP    1 326 385    7/2003

* cited by examiner

*Primary Examiner*—Emmanuel Bayard
(74) *Attorney, Agent, or Firm*—Jim Zegeer

(57) ABSTRACT

A method and apparatus for conveying to a control shelf of a multi-shelf network node any master clock signal received via a plurality of interface cards associated with a plurality of peripheral shelves of the multi-shelf network node is presented. The apparatus operating in accordance with the method includes a peripheral shelf controller having: a selector selecting an External SYNChronization (ESYNC) signal from a multitude of ESYNC signals received at an associated peripheral shelf; a comparator deriving phase difference information in comparing the selected ESYNC signal and a SSYNC signal distributed by the control shelf; and encoder for digitally encoding the phase difference information at the peripheral shelf; means for conveying a digital phase difference information digitally between a peripheral shelf and the control shelf. The apparatus further includes a control shelf controller having: a phase difference information stream selector at the control shelf selects a phase difference information stream; an ESYNC regenerator providing to a system synchronization unit an ESYNC signal regenerated from the SSYNC signal and the selected phase difference information stream. Advantages are derived from a scalable synchronization signal infrastructure providing any selected ESYNC signal received via any interface card associated with any peripheral shelf of a multi-shelf network node to the control shelf for synchronizing an SSYNC signal thereto.

20 Claims, 2 Drawing Sheets

MULTI-SHELF SYSTEM CLOCK SYNCHRONIZATION

FIELD OF THE INVENTION

The invention relates to synchronizing content transport in communications networks, and in particular to methods and apparatus for employing any master clock signal received at a multi-shelf system to synchronize content transport via the multi-shelf system.

BACKGROUND OF THE INVENTION

In the field of communications, ongoing research and development concerns master clock signal distribution and content transport synchronization.

In communications networks, a signal transport delay is incurred when content is conveyed over communications links between communications network nodes. Particularly as content is being conveyed at high bit rates, the ability of communications network nodes to synchronize content transport is diminished: on one hand, due to very short bit transmission time periods at high transport rates, and on the other hand, due to master clock signal source instabilities.

As content transport over communications networks encompassing the Earth incur signal transport delays in the order of seconds, synchronization to an absolute clock signal is hard to achieve and ensure. Attempts have been made towards this end including proposing the use of Global Positioning System (GPS) signals as a master clock signal reference. However, there are no assurances that GPS signals can be received without fail at all times under all conditions.

In the absence of absolute clock signal synchronization, signal synchronization becomes very important. The absence of signal synchronization in conveying content leads to an unbound signal skew introducing further content transport delays and overheads. The absence of signal synchronization in conveying content in the communications infrastructure also leads to an uncontrollable signal transmission and reception jitter which may put detrimental short high demands on storage at intermediary nodes in transport paths. The exemplary uncontrollable jitter and the unbound signal skew mentioned herein above are but a few of the effects typically experienced.

Towards achieving synchronization, clock standards such as Cesium clocks are typically employed to provide master clock signals. Cesium clock generated master clock signals are distributed to individual network nodes in communications networks via designated interconnecting links. While redundancy is a requirement, Cesium clock sources are expensive and if too many are used in a communications network, the synchronization of the multiple Cesium clocks becomes the stumbling block. As network nodes are designed to be multiply and redundantly interconnected in communications networks, it would be impossible to ensure that the content transport paths follow master clock signal distribution paths. Nor can it be ensured that master clock signal distribution paths follow content transport paths. Therefore, inevitably, active synchronization must be performed at each network node in a communications network.

With multiple master clocks in a communications network, multiple master clock signals are typically received at each network node. Therefore active signal synchronization at each network node must include selecting which master clock signal received to be used to phase align content conveyance thereto. Being able to select between multiple sources is desired as master clock signal sources may fail, become unreliable, or at times need servicing; and/or as the clock signal distribution infrastructure may experience failure. In accordance with various interconnectivity standards, at least two master clock signals must be provided to each network node in a communications network: one being designated as the primary master clock signal to which content transport is actively synchronized to, and the other designated as the secondary standby master clock signal to which content transport is to be synchronized to should the primary master clock signal be unavailable or experience degradation.

Take for example a typical single-shelf network node implementation, the single-shelf network node typically has a backplane design which includes a switching fabric with interface card connectors for interfacing with line cards having physical ports thereon. Communications links connect directly to the physical ports. An exemplary Bellcore Stratum-3 compliant 8 kHz System SYNChronization signal (SSYNC), is generated by a System Synchronization Unit (SSU) at each network node. The generated Bellcore Stratum-3 compliant 8 kHz SSYNC signal is frequency locked and phase locked to a selected, externally generated, master clock signal (External SYNChronization signal (ESYNC)) received via one of the physical ports of the single shelf network node. The frequency-locked phase-locked SSYNC signal is subsequently distributed to each line card associated with the single shelf network node for use in conveying content. For the purpose of ESYNC signal collection and SSYNC signal distribution, the backplane design includes special interface card special traces thereon and connector pins, to collect and distribute analog clock signals within the single shelf network node.

Recent developments in the art include:

Prior art U.S. Pat. No. 5,910,753 entitled "Direct Digital Phase Synthesis" which issued on Jun. $8^{th}$, 1999 to Bogdan describes the controlled generation of clock signals for telecommunications applications in a single shelf network node from a control voltage signal.

In a prior art U.S. patent application Ser. No. 10/087,521 entitled "Direct Digital Synthesizer Phase Locked Loop" published on Dec. $5^{th}$, 2002, O'Leary et al. describe an exemplary direct digital phase locked loop implementation (DPLL) having a numerically controlled oscillator employed in clock generation in a shelf controller of a single shelf network node system implementation. The DPLL synchronizes the system clock to a selected reference clock signal from a shelf element such as an interface card.

A co-assigned prior art U.S. Pat. No. 5,638,410 entitled "Method and System for Aligning the Phase of High Speed Clocks in Telecommunications Systems" which issued on Jun. $10^{th}$, 1997 to Kuddes describes the use of a digital delay line to phase align standby and primary clocks to minimize phase-related effects of a clock switchover in a single shelf telecommunications system should the primary clock experience a failure.

The continued increasing demand for higher content transport bandwidth has led to multi-shelf network node designs. As a side effect, the issues related to content transport synchronization and clock signal distribution in communications networks have re-emerged in respect of multi-shelf network node design and implementation. Known solutions employed in single-shelf network node systems cannot be employed in respect of multi-shelf network node systems largely because multi-shelf network node designs are optimized for content transport:

Making reference to FIG. 1, a multi-shelf network node system 100 includes a control shelf 102, a switching shelf 104, and multiple peripheral shelves 106. The peripheral shelves 106 primarily exchange content with the communication network(s) in which the multi-shelf network node 100 participates. The control shelf 102 can be employed exclusively for content transport control and may also participate in content transport.

From the point of view of content switching, the shelves of the multi-shelf system 100 have a star interconnection architecture with the switching shelf 104 as the root node. The switching shelf 104 includes a master switching fabric which switches all traffic between the peripheral shelves 106 (including the control shelf 102 if the control shelf 102 has line cards 118 installed therein). Each peripheral shelf 106 has a Fabric Card (FC) 108 to which all inter-shelf traffic is multiplexed and from which all inter-shelf traffic is demultiplexed. A high bandwidth data link 110, typically an optical fiber trunk, conveys content between at least one fabric card 108 at a peripheral shelf 106(/102) and at least one Switch Access Card (SAC) 114 at the switching shelf 104. Typically little else is provisioned between the peripheral shelves 106(/102) and the switching shelf 104 by design, as data transport optimizations are sought.

From the point of view of control, the shelves of the multi-shelf system 100 have a star interconnection architecture with the control shelf 102 as the root node. The control shelf 102 includes a backplane and control cards 112 providing control layer services to the entire multi-shelf network node system 100. Control Services Links (CSL) 116 convey control information between the control card 112 at the control shelf 102, and a corresponding shelf controller card 115 at each peripheral shelf 106.

It is understood that the entire multi-shelf system interconnectivity infrastructure is redundant. While redundant shelf controller, control, and fabric cards are shown in FIG. 1, redundant links have been omitted from FIG. 1 to simplify the diagram.

In order to achieve high levels of throughput at the multi-shelf network node system 100, the peripheral shelves 106(/102) are optimized for content switching and access to the switching shelf 104. Therefore, control services links 116 typically have low bandwidths when compared with the data links 110. Whereas the data links 110 typically include plain optical links, the control services links 116 may provide more functionality particularly in a multi-protocol multi-shelf network node deployment.

For example, due to the current market-driven necessity to consolidate voice and data communications, each control services link 116 may include an E1/T1 trunk. E1/T1 trunks are typically used for Time Division Multiplexed (TDM) transmission of digitized voice samples and voice communications control information in telephone networks. E1/T1-based transmissions adhere to a TDM frame format having frame markers recurring at an 8 kHz rate such that voice sample data corresponding to a particular service-level connection is found in the same bit position with respect to the frame marker. The standardized intended use of the Bellcore Stratum-3 compliant 8 kHz SSYNC signal relates directly to E1/T1 frame marker generation and detection—the analog characteristics of the frame marker being used in clock synchronization.

Whereas dedicated clock pins are employed by each interface card connector, and dedicated clock signal traces are employed on the backplane of a single shelf network node, a problem exists in respect of multi-shelf network node implementations 100 in bringing all clock signals derived from external communications links connected to physical ports associated with all peripheral shelves 106 to the SSU on the control card 112 of the control shelf 102, as a reference master clock signal, to synchronize content conveyance in the multi-shelf network node 100 thereto. For this reason, in a typical multi-shelf system 100 only master clock signals received via interface (line) cards (118) physically connected to the control shelf 102 can be used for content transport synchronization thereto. In the field, this restriction is seen as a hindrance in engineering and deploying communications networks employing multi-shelf network nodes 100.

There therefore is a need to solve the above mentioned issues.

SUMMARY OF THE INVENTION

In accordance with an aspect of the invention, a comparator is provided on a shelf controller of a peripheral shelf of a multi-shelf network node for determining a phase difference information between a selected ESYNC signal received via a physical port associated with the peripheral shelf by a selector and an SSYNC signal distributed from a control shelf. Transmission means are employed to convey the phase difference information to the control shelf. Employing the selector and the comparator provides flexibility in conveying any ESYNC signal from any interface card associated with the any peripheral shelf to the control shelf of the multi-shelf network node over a reduced infrastructure.

In accordance with another aspect of the invention, an ESYNC phase difference information encoder associated with the peripheral shelf controller digitally encodes the phase difference information into digitally encoded phase error words for transmission to the control shelf via a control layer infrastructure.

In accordance with a further aspect of the invention, a controller employed in a control shelf of a multi-shelf communications network node includes reception means receiving a plurality of phase difference information streams, and a selector for selecting a phase difference information stream from the plurality of phase difference information streams. The controller further includes an ESYNC signal regenerator for regenerating an ESYNC signal from a SSYNC signal and digitally encoded phase difference information. The selector and the ESYNC signal regenerator providing flexibility in receiving at the control shelf any ESYNC signal from any peripheral shelf associated with the multi-shelf network node. Employing the selector further reduces the complexity of the control shelf.

In accordance with a further aspect of the invention, a method of conveying an ESYNC signal received via a peripheral shelf of a multi-shelf network node to a control shelf thereof is provided. A plurality of ESYNC signals are received from a corresponding plurality of interface cards associated with a peripheral shelf. An ESYNC signal is selected from the plurality of ESYNC signals received. Phase difference information is derived from a comparison between the selected ESYNC signal and a System SYNC (SSYNC) signal provided from the control shelf. Phase difference information regarding the selected ESYNC signal is conveyed from the peripheral shelf to the control shelf. Selecting the ESYNC signal and deriving phase difference information at the peripheral shelf provides flexibility in conveying ESYNC signals from interface cards associated with the peripheral shelf to the control shelf of the multi-shelf network node over a reduced infrastructure.

In accordance with a further aspect of the invention, the method further includes digitally encoding the phase difference information and digitally conveying the phase difference information between the peripheral shelf and the control shelf.

In accordance with yet another aspect of the invention, the method further includes selecting a digitally encoded phase difference information stream from a plurality of digitally encoded phase difference information streams received at the control shelf, and deriving a corresponding ESYNC signal based on the SSYNC signal and the selected phase difference information stream.

Advantages are derived from a scalable synchronization signal infrastructure providing any selected ESYNC signal received via any interface card associated with any peripheral shelf of a multi-shelf network node to the control shelf for synchronizing an SSYNC signal thereto.

BRIEF DESCRIPTION OF THE DRAWINGS

The features and advantages of the invention will become more apparent from the following detailed description of the exemplary embodiments with reference to the attached diagrams wherein.

Figure 1:
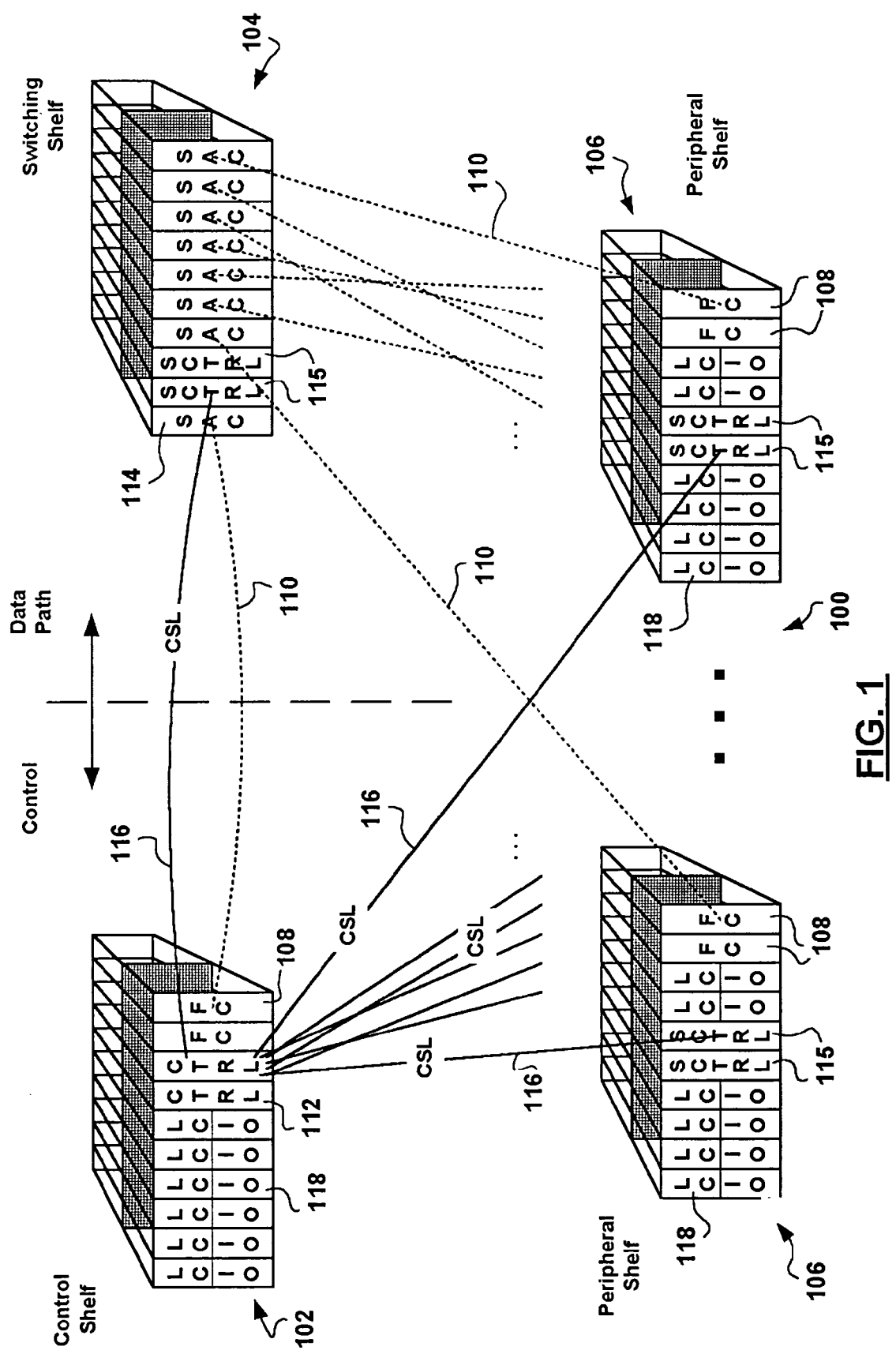
FIG. 1 is a schematic diagram showing network node shelf elements implementing a typical multi-shelf communications network node system.

It will be noted that in the attached diagrams like features bear similar labels.

DETAILED DESCRIPTION OF THE EMBODIMENTS

It is desired that a multi-shelf network node design and operation enable the selection of a master clock signal received via any interface card (line card 118) of either the control shelf 102 or any of the peripheral shelves 106 of a multi-shelf network node 100.

In view of the fact that only one E1/T1 trunk is available in the control services link 116 which could potentially bring a master clock signal, and particularly the analog characteristics thereof, from a peripheral shelf 106 to the control shelf 102, one solution would be to provide an E1/T1 trunk in a control services link 116 per peripheral shelf interface card connector. Such a solution would however suffer from: the necessity of deploying and maintaining a large number of E1/T1 trunks, a reduced port density, a complicated shelf controller 115 and control card 112 design, a dedicated non-standard shelf controller and control card connector design, a complicated control shelf backplane signal trace design, E1/T1 trunk length dependent incurred analog signal jitter and signal skew, etc. necessary to bring together all received clock signals to the SSU for possible use in content transport synchronization. Such a solution would not scale with the number of peripheral shelves per multi-shelf network node.

Figure 2:
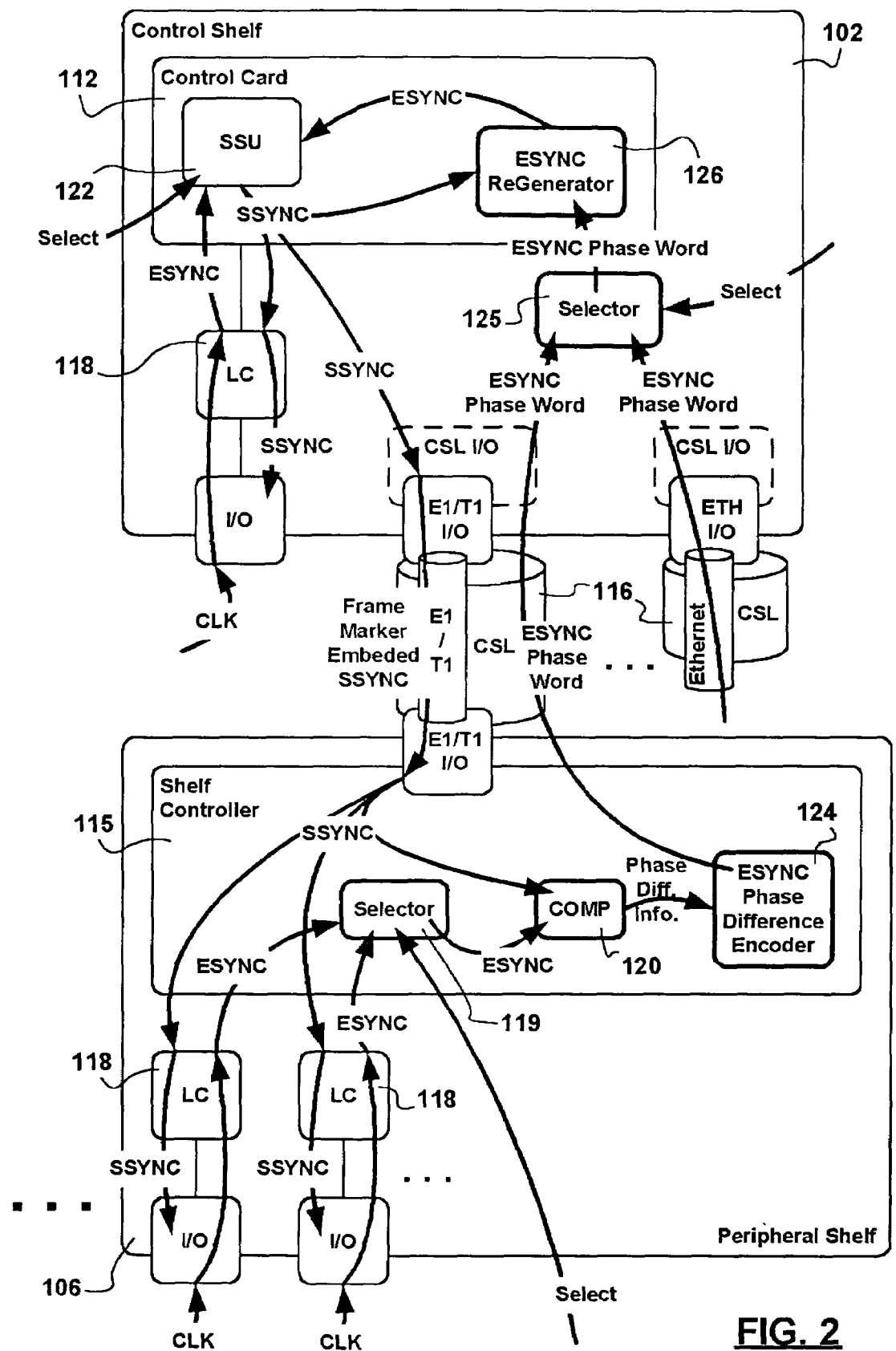
FIG. 2 is a schematic diagram showing exemplary relationships and clock signal processing step in a multi-shelf communications network node system in accordance with an exemplary embodiment of the invention.

Making reference to an exemplary implementation of an exemplary embodiment of the invention schematically shown in FIG. 2, an SSYNC signal generated by an SSU 122 associated with a corresponding control card 112, is frequency locked and phase locked to an External SYNC (ESYNC) signal provided thereto as will be described herein below, and the SSYNC signal is distributed to line cards 118 of the control shelf 102, if any, directly via existing clock signal traces on the control shelf backplane, then via existing clock pins of interface card connectors; and also distributed to all peripheral shelves 106 via the down-link frame markers of the E1/T1 trunk of each control services link 116.

At each peripheral shelf 106, the SSYNC signal is extracted at each peripheral shelf 106 from down-link frame marker of the E1/T1 trunk of the corresponding control services link 116, and distributed to each line card 118 of the peripheral shelf 106 via dedicated peripheral shelf backplane clock signal traces and interface card connector pins.

While there is a single control shelf 102 in the multi-shelf network node 100, it is understood that the entire control infrastructure described herein above is redundant: there two SSUs 122 (one on each control card 112) and paired control services links 116 from the pair of control cards 112 at the control shelf 102 connect to paired shelf controller cards 115 at each peripheral shelf 106 (and the switching shelf 104).

Externally generated master clock signals may be received via line cards 118 associated with the control shelf 102, if any, and are provided directly as ESYNC signals to the SSU 122 for selection in frequency locking and phase locking the SSYNC signal thereto.

In accordance with the exemplary embodiment of the invention, externally generated master clock signals may also be received via any (interface) line card 118 associated with any of the multiple peripheral shelves 106 of the multi-shelf network node 100. At each peripheral shelf 106, received master clock signals are provided as ESYNC signals to a ESYNC signal selector 119 associated with a shelf controller card 115 via dedicated clock interface card pins and dedicated peripheral shelf backplane clock signal traces.

In accordance with the exemplary embodiment of the invention, two best ESYNC clock signals are selected at each peripheral shelf 106 to be provided to the control shelf 102 for potential frequency lock and phase lock of the SSYNC signal thereto.

In accordance with the exemplary embodiment of the invention, a selected ESYNC signal is provided to a comparator 120 employed in determining a corresponding phase difference between the selected ESYNC signal and the SSYNC clock signal distributed by the control shelf 102.

In accordance with the exemplary embodiment of the invention, at each shelf controller card 115, derived phase difference information corresponding to a selected ESYNC signal is provided to an ESYNC phase difference encoder 124 which digitally encodes the phase difference information.

In accordance with the exemplary embodiment of the invention, the digitally encoded phase difference information corresponding to each ESYNC signal selected at each peripheral shelf 106 is conveyed to the control shelf 102 digitally over the corresponding control services links 116. In accordance with an exemplary implementation, the phase difference information is encoded in streams of phase error words. If the control services link 116 has multiple physical links conveying traffic in accordance with multiple transport protocols, the digital conveyance of the phase difference information may employ any physical link in the control services link 116. In accordance with an exemplary implementation, a control services link 116 includes, but is not limited to: an E1/T1 trunk, an Ethernet link, an RS-485 differential serial link, etc.

In accordance with the exemplary embodiment of the invention, at each control card 112, digitally encoded phase difference information (phase error word streams) for each ESYNC signal selected at each peripheral shelf 106 is provided to an ESYNC re-generator 126 associated with the control card 112. Each ESYNC re-generator 126 is directed by a selector 125 to select a particular stream of digital phase difference information (phase error word stream) associated with a corresponding selected ESYNC signal received at one of the peripheral shelves 106, and derive a corresponding ESYNC signal from the SSYNC signal. The derived ESYNC signals are provided to the SSU 122 as if received at the control shelf 102.

Each SSU 122 treats all ESYNC signals provided thereto equally and frequency locks and phase locks the SSYNC signal to a selected primary ESYNC signal as directed.

Therefore, in accordance with the exemplary embodiment of the invention, at the control shelf 102 any master clock signal from any interface card in the entire multi-shelf network node 100 can be selected as the primary and secondary master clock signals. The use of comparators 120 and ESYNC phase difference information encoders 124 at the peripheral shelf 106, and the use of ESYNC regenerators 126 at each control card 112 of the control shelf 102 distributes clock signal processing in the multi-shelf network node system and results in a reduction in the number of clock signals to be provided to the control shelf 102 while still providing flexibility and redundancy.

In accordance with the exemplary embodiment of the invention, by detecting phase differences between ESYNC signals and the SSYNC signal at the peripheral shelves 106, instead of at the control shelf 102; jitter, skew, and noise distortions in providing ESYNC signals from the peripheral shelves 106 to the control shelf 102 are minimized.

In accordance with the exemplary embodiment of the invention, the digital transmission of phase difference information from each peripheral shelf 106 to the control shelf 102, by exploiting existing control services links 116, eliminates the otherwise necessary additional wiring thereby reducing deployment and ongoing maintenance costs.

In accordance with the exemplary embodiment of the invention, the re-generation of ESYNC signals at the control shelf 102, which are treated equivalent to ESYNC signals derived from master clock signals received directly at the control shelf 102, provides an SSU independent solution which allows a standard or commercial SSU 112 to be employed and/or upgraded independently.

The embodiments presented are exemplary only and persons skilled in the art would appreciate that variations to the above described embodiments may be made without departing from the spirit of the invention. The scope of the invention is solely defined by the appended claims.

We claim:

1. A peripheral shelf controller employed in a peripheral shelf of a multi-shelf communications network node, the shelf controller comprising:
   a. a selector specifying an External SYNChronization (ESYNC) signal from a plurality of ESYNC signals received via a plurality of interface cards associated with the peripheral shelf;
   b. a comparator, responsive to the selector, deriving phase difference information between the selected ESYNC signal and a System SYNChronization (SSYNC) signal distributed to the peripheral shelf from a control shelf of the multi-shelf communications network node; and
   c. transmission means for conveying the phase difference information for the selected ESYNC signal to the control shelf,
   employing the selector and the comparator providing flexibility in conveying any ESYNC signal from any interface card associated with the peripheral shelf to the control shelf of the multi-shelf network node over a reduced infrastructure.

2. The peripheral shelf controller claimed in claim 1, wherein the transmission means further includes an ESYNC phase difference information encoder encoding the derived phase difference information, the conveyance of phase difference information to the control shelf further including digital transmission of phase difference information as a corresponding digitally encoded phase error word.

3. The peripheral shelf controller claimed in claim 1, wherein a control services link connects to the peripheral shelf controller for conveying the SSYNC signal distributed thereto.

4. The peripheral shelf controller claimed in claim 1, wherein a control services link connects to the peripheral shelf controller for conveying ESYNC phase difference information digitally to the control shelf.

5. The peripheral shelf controller claimed in claim 4, wherein the control services link further includes an E1/T1 trunk, the SSYNC signal being embedded in a down-link frame marker without utilizing additional resources of the multi-shelf communications network node, the comparator determining phase difference information between the selected ESYNC signal and analog characteristics of the frame marker.

6. The peripheral shelf controller claimed in claim 4, wherein the control services link further includes one of an E1/T1 trunk, an Ethernet link and a serial link, wherein conveying phase difference information digitally to the control shelf further employing one of the E1/T1 trunk, the Ethernet link and the serial link.

7. The peripheral shelf controller claimed in claim 1, further comprising a peripheral shelf controller card connectable to the peripheral shelf.

8. A controller employed in a control shelf of a multi-shelf communications network node, the controller comprising:
   a. reception means receiving a plurality of phase difference information streams;
   b. a selector for selecting a phase difference information stream from the plurality of phase difference information streams; and
   c. an External SYNChronization (ESYNC) signal regenerator providing an ESYNC signal derived from the selected phase difference information stream and a System SYNChronization (SSYNC) signal to a System Synchronization Unit (SSU) for synchronization of the SSYNC signal to the regenerated ESYNC signal,
   the selector and the ESYNC signal regenerator providing flexibility in receiving at the control shelf any ESYNC signal from any peripheral shelf associated with the multi-shelf network node, employing the selector further reducing the complexity of a the control shelf.

9. The controller claimed in claim 8, wherein the reception means receives a plurality of digital phase difference information streams each of which further comprising a stream of phase error words, digital transmission of phase difference information reducing signal skew and jitter effects.

10. The controller claimed in claim 9, wherein the reception means further connects to a plurality of control services links each of which corresponding to a peripheral shelf of the multi-shelf communications network node for receiving of phase difference information stream therefrom.

11. The controller claimed in claim 10, wherein the control services link further comprises one of an E1/T1 trunk, an Ethernet link, and a serial link for digital reception of the digitally encoded phase difference information stream from the corresponding peripheral shelf.

12. The controller claimed in claim 8, further comprising a shelf controller card connectable to the control shelf of the multi-shelf network node.

13. A method of conveying an External SYNChronization (ESYNC) signal received via a peripheral shelf of a multi-shelf network node to a control shelf thereof, the method comprising steps of:
   a. receiving a plurality of ESYNC signals from a corresponding plurality of interface cards associated with a peripheral shelf;
   b. selecting an ESYNC signal from the plurality of ESYNC signals received;
   c. deriving phase difference information from a comparison between the selected ESYNC signal and a SSYNC signal provided from the control shelf; and
   d. conveying phase difference information regarding the selected ESYNC signal from the peripheral shelf to the control shelf,
   selecting the ESYNC signal and deriving phase difference information at the peripheral shelf providing flexibility in conveying ESYNC signals from the interface cards associated with the peripheral shelf to the control shelf of the multi-shelf network node over a reduced infrastructure.

14. The method claimed in claim 13, wherein conveying the phase difference information, the method further comprises a step of: encoding the phase difference information into digital phase difference information.

15. The method claimed in claim 14, wherein encoding phase difference information into digital phase difference information, the method further comprises a step of: encoding the phase difference information into a phase error word.

16. The method claimed in claim 14, wherein encoding phase difference information into digital phase difference information, the method further comprises a step of: encoding the phase difference information into a stream of phase error words.

17. The method claimed in claim 14, wherein conveying the phase difference information, the method further comprises a step of: digitally conveying the phase difference information over a control services link to the control shelf of the multi-shelf network node.

18. The method claimed in claim 17, wherein digitally conveying the phase difference information over a control services link, the method comprises a step of: digitally conveying a phase difference information stream over the control services link.

19. The method claimed in claim 18, comprising subsequent steps of:
   a. selecting a digitally encoded phase difference information stream from a plurality of digitally encoded phase difference information streams received at the control shelf; and
   b. deriving a corresponding ESYNC signal based on the SSYNC signal and the selected phase difference information stream.

20. The method claimed in claim 19, further comprising a step of: providing the derived ESYNC signal to an System Synchronization Unit (SSU) for frequency locking and phase locking thereto, providing SSYNC signal synchronization to any ESYNC signal received at the plurality of interface cards associated with the multi-shelf network node.

* * * * *